Sept. 25, 1951 W. SHOCKLEY 2,569,347

CIRCUIT ELEMENT UTILIZING SEMICONDUCTIVE MATERIAL

Filed June 26, 1948 3 Sheets-Sheet 1

INVENTOR
W. SHOCKLEY
BY [signature]
ATTORNEY

Sept. 25, 1951 W. SHOCKLEY 2,569,347

CIRCUIT ELEMENT UTILIZING SEMICONDUCTIVE MATERIAL

Filed June 26, 1948 3 Sheets-Sheet 2

INVENTOR
W. SHOCKLEY
BY [signature]
ATTORNEY

CIRCUIT ELEMENT UTILIZING SEMICONDUCTIVE MATERIAL

Filed June 26, 1948 3 Sheets-Sheet 3

INVENTOR
W. SHOCKLEY
BY R. J. Guenther
ATTORNEY

Patented Sept. 25, 1951 2,569,347

UNITED STATES PATENT OFFICE 2,569,347

CIRCUIT ELEMENT UTILIZING SEMICONDUCTIVE MATERIAL

William Shockley, Madison, N. J., assignor to Bell Telephone Laboratories, Incorporated, New York, N. Y., a corporation of New York Application June 26, 1948, Serial No. 35,423

34 Claims. (Cl. 332—52)

This invention relates to means for and methods of translating or controlling electrical signals and more particularly to circuit elements utilizing semiconductors and to systems including such elements.

One general object of this invention is to provide new and improved means for and methods of translating and controlling, for example amplifying, generating, modulating, intermodulating or converting, electric signals.

Another general object of this invention is to enable the efficient, expeditious and economic translation or control of electrical energy.

In accordance with one broad feature of this invention, translation and control of electric signals is effected by alteration or regulation of the conduction characteristics of a semiconductive body. More specifically, in accordance with one broad feature of this invention, such translation and control is effected by control of the characteristics, for example the impedance, of a layer or barrier intermediate two portions of a semiconductive body in such manner as to alter advantageously the flow of current between the two portions.

One feature of this invention relates to the control of current flow through a semiconductive body by means of carriers of charge of opposite sign to the carriers which convey the current through the body.

Another feature of the invention pertains to controlling the current flowing through a semiconductive body by an electrical field or fields in addition to those responsible for normal current flow through the body.

An additional feature of this invention relates to a body of semiconductive material, means for making electrical connection respectively to two portions of said body, means for making a third electrical connection to another portion of the body intermediate said portions and circuit means including power sources whereby the influence of the third connection may be made to control the flow of current between the other connections.

Another feature pertains to a semiconductive body comprising successive zones of material of opposite conductivity type each separated from the other by an electrical barrier, means for making external connection respectively to two of said zones, and means for making other connections intermediate to the two for controlling the flow of current across one or more of the electrical barriers.

A further feature resides in a body of semiconductive material comprising two zones of material of opposite conductivity type separated by a barrier, means for making external electrical connections respectively to each zone and means for making a third connection to the body at the barrier for controlling the flow of current between the other two connections.

An additional feature pertains to a semiconductive body comprising two zones of material of like conductivity type with an intermediate zone of material of opposite conductivity type, the zones being separated respectively by barriers, means for making electrical connections respectively to the two zones, and means for making a third connection to the intermediate zone for controlling the effectiveness of a barrier to thereby control the flow of current between the zones of like material.

Another feature of this invention involves a semiconductive body which may be used for voltage and power amplification when associated with means for introducing mobile carriers of charge to the body at relatively low voltage and extracting like carriers at a relatively high voltage.

A further feature of the invention involves creation of voltage and barrier conditions adjacent an output connection or point of extraction of current whereby current amplification in addition to voltage amplification may be obtained.

Other objects and features of this invention will appear more fully and clearly from the following description of illustrative embodiments thereof taken in connection with the appended drawings in which.

Figure 1:
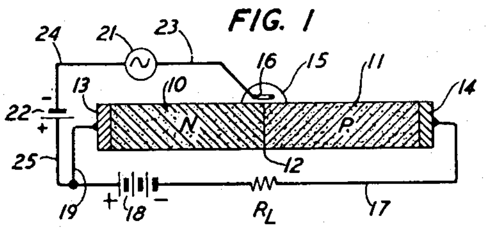
Fig. 1 shows in section one embodiment of the invention with an appropriate circuit.

As an aid to a full understanding of the description hereinafter of specific embodiments of the invention, a brief discussion of some pertinent principles and phenomenon, and an explanation of certain terms employed in the description is in order.

As is known, see, for example, "Crystal Rectifiers" by H. C. Torrey and C. A. Whitmer, volume 15 of the M. I. T. Radiation Laboratories series, there are two kinds of semiconduction, referred to as intrinsic and extrinsic. Although some of the semiconductive materials contemplated within the purview of this invention may exhibit both these kinds of semiconduction, the kind referred to as extrinsic is of principal import.

Semiconduction may be classified also as of two types, one known as conduction by electrons or the excess process of conduction and the other known as conduction by holes or the defect process of conduction. The term "holes," which refers to carriers of positive electric charges as distinguished from carriers, such as electrons, of negative charges will be explained more fully hereinafter.

Semiconductive materials which have been found suitable for utilization in devices of this invention include germanium and silicon containing minute quantities of significant impurities which comprise one way of determining the conductivity type (either N or P-type) of the semiconductive material. The conductivity type may also be determined by energy relations within the semiconductor. For a more detailed explanation reference is made to the application of J. Bardeen and W. H. Brattain Serial No. 33,466, filed June 17, 1948, now U. S. Patent No. 2,524,035, granted October 3, 1950.

The terms N-type and P-type are applied to semiconductive materials which tend to pass current easily when the material is respectively negative or positive with respect to a conductive contact thereto and with difficulty when the reverse is true, and which also have consistent Hall and thermoelectric effects.

The expression "significant impurities" is here used to denote those impurities which affect the electrical characteristics of the material such as its resistivity, photosensitivity, rectification, and the like, as distinguished from other impurities which have no apparent effect on these characteristics. The term "impurities" is intended to include intentionally added constituents as well as any which may be included in the basic material as found in nature or as commercially available. Germanium and silicon are such basic materials which, along with some representative impurities, will be noted in describing illustrative examples of the present invention. Lattice defects such as vacant lattice sites and interstitial atoms when effective in producing holes or electrons are to be included in "significant impurities."

In semiconductors which are chemical compounds, such as cuprous oxide or silicon carbide, deviations from stoichiometric compositions and lattice defects, such as missing atoms or interstitial atoms, may constitute the significant impurities.

Small amounts of impurities, such as phosphorus in silicon, and antimony and arsenic in germanium, are termed "donor" impurities because they contribute to the conductivity of the basic material by donating electrons to an unfilled "conduction" energy band in the basic material. The donated negative electrons in such a case constitute the carriers of current and the material and its conductivity are said to be of the N-type. This is also known as conduction by the excess process. Small amounts of other impurities, for example boron in silicon or aluminum in germanium, are termed "acceptor" impurities because they contribute to the conductivity by "accepting" electrons from the atoms of the basic material in the "filled band." Such an acceptance leaves a gap or "hole" in the "filled band." By interchange of the remaining electrons in the "filled band," these positive "holes" effectively move about and constitute the carriers of current, and the material and its conductivity are said to be of the P-type. The term defect process may be applied to this type of conduction.

Methods of preparing silicon of either conductivity type or a body of silicon including both types are known. Such methods are disclosed in the application of J. H. Scaff and H. C. Theuerer filed December 24, 1947, Serial No. 793,744, and United States Patents 2,402,661 and 2,402,662 to R. S. Ohl. Such materials are suitable for use in connection with the present invention. Germanium material may also be made in either conductivity type or in bodies containing both types and it may be so treated as to enable it to withstand high voltages in the reverse direction from the rectification viewpoint. This material may be prepared in accordance with the process disclosed in the application of J. H. Scaff and H. C. Theuerer filed December 29, 1945, Serial No. 638,351. Bodies of semiconductive material for use in the practice of this invention may also be prepared by pyrolytic deposition of silicon or germanium with suitable significant impurities. Methods of preparation are outlined in United States patent applications of K. H. Storks and G. K. Teal Serial No. 496,414, filed July 28, 1943, now U. S. Patent No. 2,441,603, granted May 18, 1948; G. K. Teal Serial No. 655,695, filed March 20, 1946, now U. S. Patent No. 2,556,991, granted June 12, 1951; and G. K. Teal Serial No. 782,729, filed October 29, 1947, now U. S. Patent No. 2,556,711, granted June 12, 1951.

The term "barrier" or electrical barrier used in the description and discussion of devices in accordance with this invention is applied to a high resistance interfacial condition between contacting semiconductors of respectively opposite conductivity types or between a semiconductor and a metallic conductor whereby current passes with relative ease in one direction and with relative difficulty in the other.

The devices to be described are relatively small which has necessitated some exaggeration of proportions in the interest of clarity in the illustrations which are mainly or essentially diagrammatic. This is particularly true of the intermediate or intervening layers which are usually very thin. In some cases this layer, e. g. the P layer in Fig. 11, has been shown wider than the flanking N layers in order that the accompanying energy level diagrams may be more clearly shown. The dimension in the direction perpendicular to the paper may vary in accordance with the cross-sectional area required.

The device shown in Fig. 1 comprises a body or block of semiconductive material, for example germanium, containing significant impurities. The block comprises two zones 10 and 11 respectively of N and P-type materials separated by the barrier 12. The opposite ends of the block are provided with connections 13 and 14 which may be metallic coatings, such as cured silver paste, a vapor-deposited metal coating or the like.

Means for making connection to the barrier region of the block comprise a drop of electrolyte 15 such as glycol borate in which is immersed a wire loop 16, or other suitable means, such as a disc of metal.

Conductor 17 leads from connection 14 to a load $R_L$ and thence through a power source, such as battery 18, and back via conductor 19 to the body at connection 13. A source 21 of signal voltage and a bias source 22 are connected from 16 at the barrier to connection 13 by conductors 23, 24 and 25. With N and P zones as shown in Fig. 1, the negative pole of source 18 is connected to the P zone and the positive pole to the N zone.

The connection to the body at the barrier through the electrolyte 15 is a means of impressing a field at this barrier and parallel thereto, and is in the nature of a capacitative connection since there is substantial isolation between the electrolyte and the surface of the body.

The biasing source 22 is shown with its negative pole connected to the barrier connection 16 since better results have been obtained with such a connection. However, a positive bias may be used with good results.

A successfully operated device of this type was about 2 centimeters long, 0.5 centimeter wide and 0.5 centimeter thick. The barrier was about midway between the end faces and substantially parallel to them. The bias voltages upon the electrodes 16 and 14 relative to electrode 13 were of the same order of magnitude, between 10 and 20 volts.

Using devices like that of Fig. 1, a current change of a few microamperes in the control circuit was made to produce a current change of several milliamperes in the load circuit through $R_L$. Thus current amplification was obtained. The current gain was sufficient to produce power amplification at the voltages used.

Figure 2:
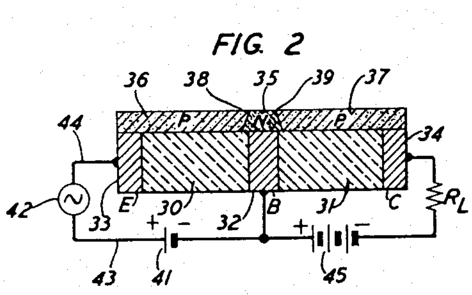
Fig. 2 shows in section another embodiment of the invention with illustrative circuit connections.

The device disclosed in Fig. 2 comprises two blocks or bodies 30 and 31 of insulating material, such as a ceramic, with an electrode 32 interposed between these blocks and electrodes 33 and 34 secured to their outer ends. A film of P-type germanium is applied to one face of the electrode-ceramic assembly making ohmic contact with the electrodes. This film is exaggerated as to thickness in the figure. The electrode 32 may be made of an antimony or phosphorus bearing alloy, such as a copper-antimony alloy or phosphor bronze so that heat treatment will cause antimony or phosphorus to diffuse into the P-type germanium changing it to N-type in a zone 35 between two P-type zones 36 and 37. The three zones are separated by barriers 38 and 39, respectively. The heat treatment for diffusing antimony from the electrode 32 into the zone 35 may be at about 650° C. and for diffusing phosphorus from phosphor bronze at about the same temperature. The diffusion of the significant impurity into the film may be so controlled, as by regulating the time of the heat treatment, that the material at the surface of the zone 35 opposite to that contacted by the electrode 32 is substantially neutral or only slightly N-type or, on the other hand, left as P-type. Following nomenclature which has been used for devices of this type, the electrodes 32, 33 and 34 may be called respectively, base, emitter, and collector. The designations B, E and C have been applied to these and like electrodes in other figures to aid in understanding the structure.

The device of Fig. 2 may be operated as an amplifier or control device by applying a relatively small positive bias, for example of the order of one volt, and a signal from sources such as battery 41 and signal source 42, respectively, to electrode 33 through input connections 43 and 44, the negative side of the battery 41 being connected to the base electrode 32. The output circuit includes a relatively high voltage source, for example of voltage between 10 and 100 volts, such as battery 45 with its negative pole connected to 34 and its positive pole to base electrode 32. Included in this circuit is a load represented by a resistance $R_L$.

If no P-type material remains in zone 35 the operation is as follows: A positive or hole current will flow into the P zone 36 under the influence of sources 41 and 42. The negative bias on the N zone 35 from battery 41 injects electrons into this zone and reduces the impedance to hole current therethrough. The negative bias of battery 45 on electrode 34 then causes a hole current to flow to the output through electrode 34. Enough of the electrons and holes remain uncombined so that a control analogous to that in a three-electrode vacuum tube is obtained. The input current is in the direction of easy flow across the barrier 38 so the impedance of this barrier thereto is relatively low. The output current is in the direction of difficult flow through reversely operated barrier 39 so the output is of high impedance. The output current is comparable to the input current but through a much higher impedance; therefore, the output power is higher than that at the input. A more complete explanation of the operation of this and the other devices will be given subsequent to a description of the other embodiments of the invention. If a thin layer of P-type material is left at the surface opposite to where 32 makes contact, the control field will vary the effective thickness of this layer to affect current flow.

Figure 3:
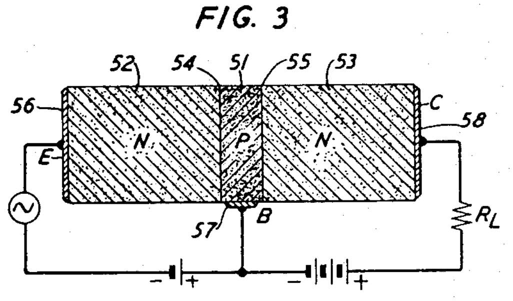
Fig. 3 shows in section an embodiment somewhat similar to that of Fig. 2 with certain structural differences and with a suitable circuit arrangement.

The device of Fig. 3 comprises a layer or zone 51 of P-type material, such as germanium, interposed between two layers or zones 52 and 53 of N-type material which also may be germanium, separated respectively by barriers 54 and 55. Connections are made to each layer by electrodes 56, 57, and 58, respectively, which may be termed as in the case of the device of Fig. 2, (56) emitter, (57) base, and (58) collector. These electrodes may be formed as in the device of Fig. 1. The circuit connections are similar to those in Fig. 2 with polarities reversed because of the interchanging of N and P zones. In this device, the P layer 51 may be made amenable to control by making it very thin, e. g. $1\times10^{-3}$ centimeter or less or only slightly of P-type or both. The impedance of the P zone to electron flow will be low enough so that introduction of holes into the P zone by the positive bias thereon will have a considerable control effect. Electrons may thus be made to flow with comparative ease through the P zone due to the effect of the voltage on the base electrode and will be drawn to the collector 58 and abstracted. Here as in the case of Fig. 2, in one way of operation, the input is of low impedance, the output of high impedance, and the input and output currents comparable with resulting power amplification.

Figure 4:
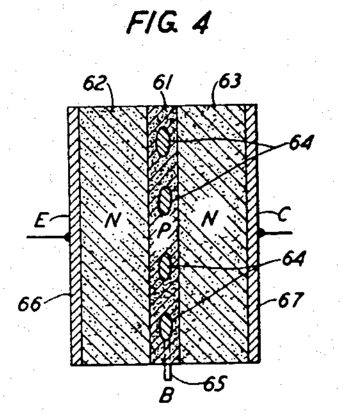
Fig. 4 shows in section a modification of Fig. 3 in which an embedded electrode is used.

In Fig. 4 there is shown a device similar to the one in Fig. 3 but with a different means for connecting to the intermediate zone of semiconductive material. In this modification, the P zone 61 is interposed between N zones 62 and 63. A metallic grid, sections of which are shown at 64, is embedded in the P zone and has a projecting portion 65 to which external connection may be made. This grid serves as the base electrode. The emitter and collector electrodes 66 and 67, respectively, and the respective N zones are similar to those in the device of Fig. 3. This device may be operated like the device of Fig. 3 with appropriate connections to the emitter, base and collector electrodes.

Figure 5:
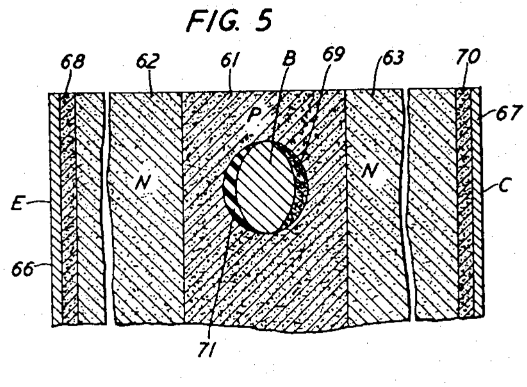
Fig. 5 shows in fractional section a further modification of the type of device shown in Fig. 4 and including features of detail also applicable to other embodiments.

The fractional view, Fig. 5, shows a portion of a device similar to that of Fig. 4 with modifications in detail. In order to insure a good, substantially ohmic contact between the electrodes and the semiconductive material, a relatively thin layer of the semiconductive material adjacent each electrode is made of material having a higher concentration of significant impurities of the type characterizing the conductivity type. These high impurity layers will have higher conductivity than the rest of the semiconductive material in the given zone and thus less tendency toward barrier formation at the electrode-semiconductor interface. These layers are 68, 69, and 70 for the emitter, base (grid), and collector electrode, respectively. Such high impurity layers may be used in the other embodiments of the invention.

In order to shield the grid or base electrode 64 from the effects of the field of the emitter, a layer of insulation 71, is applied to the side of the grid facing the emitter electrode. The flow of charge carriers is thus directed through the grid between its conductors.

Figure 6:
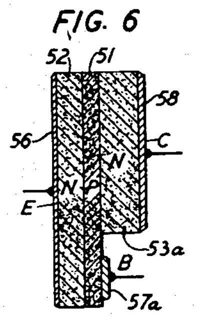
Fig. 6 shows an embodiment of the invention similar to that illustrated in Fig. 3 with a different arrangement for making connection to part of the device.

The device shown in Fig. 6 is similar to the one shown in Fig. 3 with a layer 53*a* of reduced extent allowing a contact 57*a* on a face of the P layer 51.

Figure 7:
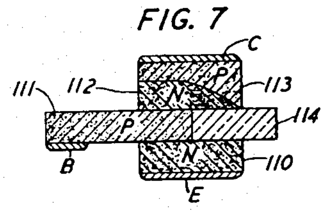
Fig. 7 shows an assembled slab structure embodying some particular structural details.

In Fig. 7 there are shown a plurality of assembled semiconductive layers or slabs 110 to 113, inclusive. An insulator slab 114 is included in place of part of the intermediate P layer and the N layer on the collector side is tapered toward the insulator to reduce sidewise flow of electrons therein and thus path length from B to the N layer on the collector side.

Additional functions may be performed by devices containing more layers and electrodes.

Figure 8:
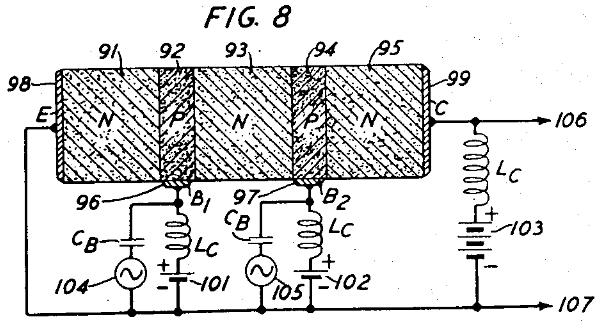
Fig. 8 shows, with an appropriate circuit, a sectional view of an embodiment of the invention having more than one control portion.

Fig. 8 shows a configuration which may be used as a mixer or converter. Five layers or zones 91 to 95, inclusive, are shown which are alternately N and P. Layers 91 and 95 are similar to the emitter and collector layers of the three-electrode device, e. g. of Fig. 3. However, there are two P layers, 92 and 94, separated by N layer 93. Separate electrodes 96 and 97 are connected respectively to the two P layers, making a four-electrode device in which 98 and 99 are the emitter and collector electrodes. The current reaching 99 will be a function of the voltages applied to 96, 97 and 99, 98 being regarded as grounded. This function will be non-linear in the voltages and will contain quadratic terms involving products of the voltages on 96 and 97. These product terms will play the same role as in other non-linear mixers or converters and will lead to collector current components having frequencies which are combinations of those applied to 96 and 97.

The voltages may be applied respectively to 96 and 97 from sources 101, 104 and 102, 105, these being bias and signal voltages as indicated. The signal voltages could be from a local oscillator and an incoming signal, for example, or be other signals to be mixed. The output is taken from 106 and 107 and source 103 provides the collector bias. $L_C$ and $C_B$ are isolating chokes and blocking condensers, respectively.

Figure 9:
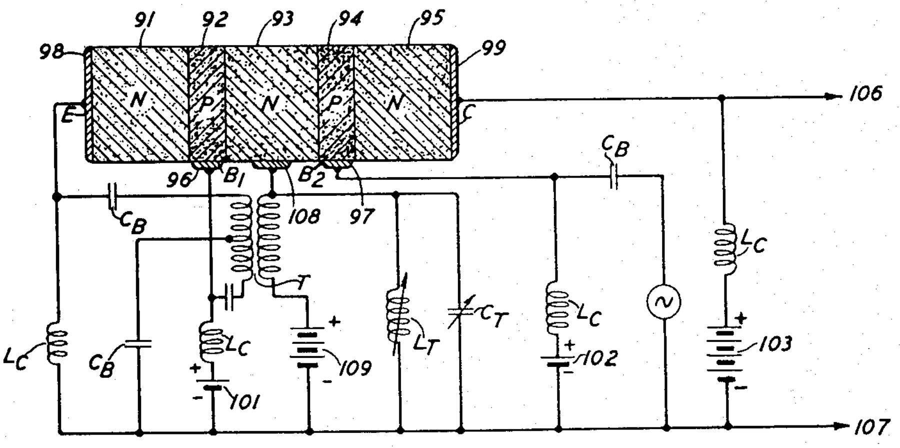
Fig. 9 shows in section a device similar to that of Fig. 8 with a different circuit arrangement.

In Fig. 9 a device like that in Fig. 8 is provided with an additional electrode 108 on the middle N region and arranged so that layers 91, 92 and 93 with suitable connections as shown comprise an oscillator. The input is applied to layer 94 and the mixed output taken from 106 and 107. The sources of energy correspond to those in Fig. 8 with source 109 added as the "collector" bias for the oscillator section. $L_T$ and $C_T$ are tuning elements of the oscillator section, $L_C$ and $C_B$ are the chokes and blocking condensers and T the coupling transformer.

Figure 3A:
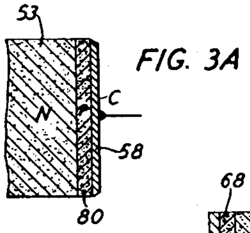
Figs. 3A and 3B show in fractional sections modifications of Fig. 3.
Figure 3B:
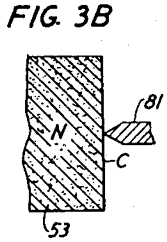

In addition to the voltage and thus power amplification which may be obtained with devices of this type, current amplification may be obtained by setting up at the collector electrode a condition similar to that required for rectification. This may be done by making the collector electrode a rectifier contact of the point or large area type rather than a substantially ohmic contact. Another way of doing this is to leave the actual contact at the electrode ohmic and to introduce a small region of opposite type material to that of the collector zone around the collector electrode. For example, in a device like that of Fig. 3 a zone 80 of P-type material may be introduced between the collector electrode 58 and the N zone 53, as shown in Fig. 3A or, as shown in Fig. 3B, a point contact 81 may be substituted for electrode 58 or electrode 58 may be applied in a manner to set up a barrier. With collector connections of this type, the output current may be made greater than the input current as will be subsequently explained.

Figure 10:
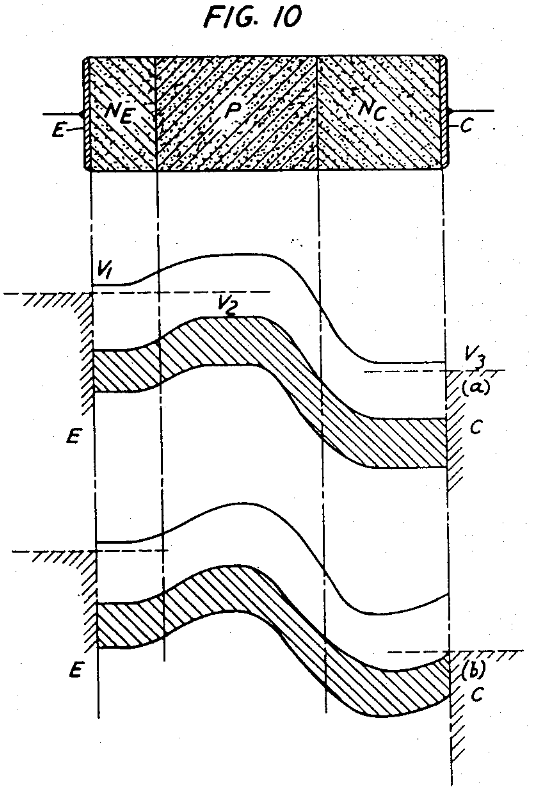
Fig. 10 shows a two-electrode device otherwise similar to that of Fig. 3, adaptable as a transit time diode with energy level diagrams useful in explaining its operation.

Structures similar to those described but having only two electrodes can be used as negative resistance elements at very high frequencies making use of transit time effects. Fig. 10 represents such a device. It comprises three substantially parallel layers $N_e$, P and $N_c$, of alternating impurity content with two metal electrodes, one at either side. In the example shown, the conductivity is supposed to be entirely due to electrons. When voltages are applied as indicated at *a* in Fig. 10, there will be an electron current flowing from $N_e$ to $N_c$. This current will, of course, increase with increasing applied potential. When the potential $V_3$ is increased there will be a corresponding increase in the potential $V_2$. As a consequence of this, the electron flow from $V_1$ through the P region of $V_2$ will be increased. However, there will be a time lag between the increase of $V_3$ and the actual flow of electrons from P to $N_c$. As a consequence of this, the electron current flowing between P and $N_c$ will be out of phase with the voltage $V_3$. With the type of structure shown, this phase lag will be sufficient so that the current flowing between P and $N_c$ can be made more than 90 degrees out of phase with the voltage on $V_3$. Under these conditions the impedance of the device as viewed looking in on the $V_3$ terminal will exhibit negative resistance.

The theory of somewhat related electronic devices involving negative resistance due to transit time is known in the literature. See for example Bell System Technical Journal January 1934 (vol. 13) and October 1935 (vol. 14). In order for such devices to operate it is necessary that the transient response for a change in voltage on $V_3$ have a suitable characteristic. The principal requirement of this characteristic is that the build-up in current following the change in $V_3$ should occur with a certain delay after the change in $V_3$. In the type of device shown in Fig. 10, this desired feature will occur automatically. The reason for this is that electrons drift relatively slowly through the P region, whereas they will traverse the P to $N_c$ gap rapidly because of the high electric field present there. As a consequence of this, electrons which flow from $N_e$ to P during one phase of $V_3$ carry their principal current from P to $N_c$ at a later time and can thus be made to flow more than 90 degrees out of phase with the voltage applied to $V_3$ and in this way furnish negative resistance.

These effects may be further enhanced by use of a structure of the form shown in Fig. 10 having a barrier as illustrated by the diagram Fig. 10B. This shows a situation at the collector similar to that described earlier in connection with Figs. 3A and 3B. In this case there is a barrier for electron flow from $N_c$ to C. Electrons accumulating in the potential minimum to the left of C will enhance hole flow from C back to P and hence to E. Transit time effects will occur both in the electron flow from P to $N_c$ and in the development of a potential difference across the barrier in front of C due to electron accumulation and to hole transmit time through the $N_c$ region. These effects can again be utilized to produce a negative resistance for the device at a frequency properly adjusted to the over-all effective transit time and the shape of the current response curve.

It is believed that a logical explanation of the operation of devices made in accordance with this invention may be given with respect to a device like that of Fig. 3. Although the electrical currents of interest in semiconductors are, according to theory, carried by electrons, it is also well known in accordance with such theory that the electrons may carry the current either by the excess process, called conduction by electrons, or by the defect process, called conduction by holes.

For purposes of explanation, consideration will be given to how two processes of conduction by electrons enables a conventional vacuum tube to operate. In the vacuum tube case, the two processes are (1) metallic conduction and (2) thermionic emission followed by flow through space. When the voltage on the grid of the tube is changed, its charge is changed by a flow of current into its leads and wires by metallic conduction. This charge exerts a field which attracts or repels the thermionic electron space charge about the cathode and thus the space current passing through the grid to the plate. An important and useful feature of a vacuum tube is that these two currents do not become mixed; the high work function and low temperature of the grid wires prevent the metallic conduction current from escaping from the grid and flowing to the plate. The fact that the grid is negative with respect to the cathode prevents the space current from reaching the grid. Thus the flow of electrons by metallic conduction in the grid controls the space current from cathode to plate. However, practically no power is consumed by the grid since its charging current is separated from the space current which it controls. This discussion, which neglects some elements of vacuum tube theory (such as displacement currents, transit time effects, etc.) will serve as a basis for indicating how the two processes of conduction in semiconductors may effect a similar useful control of one form of current by another.

Figure 11:
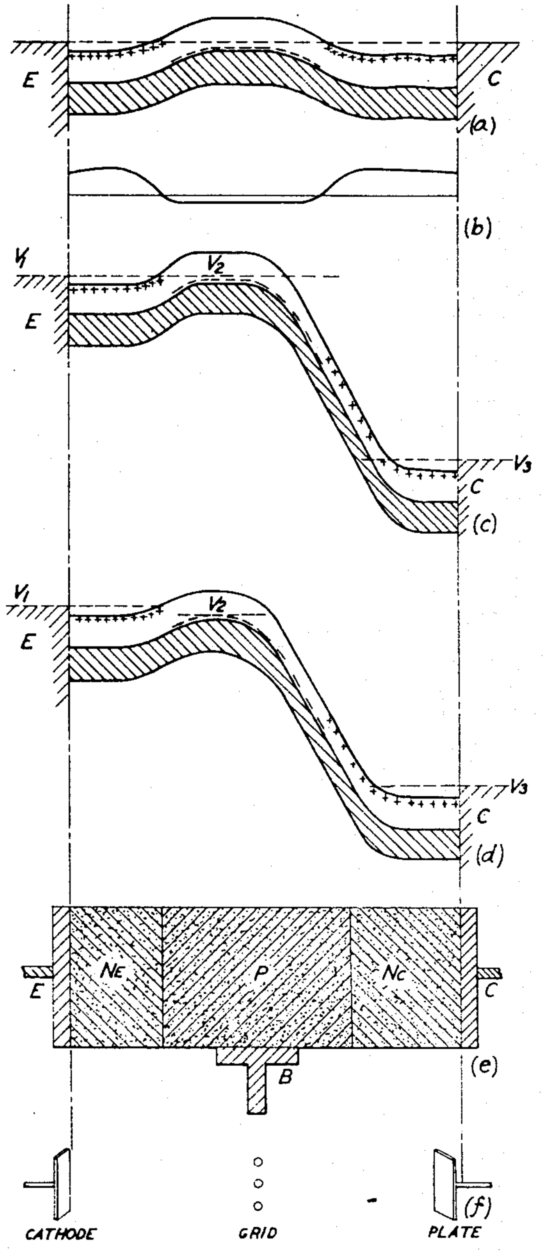
Fig. 11 is a diagrammatic showing of curves associated with circuit elements to aid in explaining certain principles of the invention.

In Fig. 11 there is shown a representation of a semiconductor structure which is analogous to a three-electrode vacuum tube. In this figure, diagrams *a*, *c* and *d* show the energies of electrons in the filled and conduction bands in the semiconductor in the customary way. The physical structure of the semiconductor is represented at *e* and consists of three regions of semiconductor with connecting electrodes corresponding to the cathode, grid and plate of a vacuum tube as shown at *f*. The different parts of the semiconductor are in intimate contact, so that there are no surface states (such as occur on the free surfaces of semiconductors) or other major imperfections at the boundaries. The principal variation in properties should arise from the varying concentration of impurities as shown at *b* which represents the concentration of donors minus the concentration of acceptors.

In *a*, there are no potentials applied to the electrodes and the Fermi level is independent of position. (The "Fermi level," sometimes called the chemical potential for electrons, is the parameter $\epsilon'$ in the Fermi-Dirac distribution function $f=1/[1+\exp(\epsilon-\epsilon'/kT)]$. It can be interpreted as a potential by dividing by the charge on the carrier, in this case the neagtive charge of the electron.) For the case illustrated, the conductivity in the N layers is due to electrons and in the P layer to holes. The diagram has been drawn to show a much higher electron concentration in N than holes in P. In fact, the N concentration is so high that a degenerate gas is formed as in a metal.

If electrodes E and B (diagram *e* of Fig. 11 are maintained at a potential $V_1$ and C is made more positive to a potential $V_2$, the situation shown in diagram *c* occurs. This corresponds to applying voltage in the reverse direction across the $N_c$-P junction of diagram *e*. In this case, small current flows because the voltages are such as to pull electrons from left to right and holes from right to left. The electrons which can be pulled to the right are those available in the P region. They represent a very small number compared to the holes present, since the Fermi level lies much closer to the filled band than to the conduction band and (except for the degenerate case) the number of carriers decreases as $\exp(-q\Delta V/kT)$ where $\Delta V$ is the spacing between the Fermi level and the band concerned, and $q$ is the electronic charge. As a consequence of the small number of holes in the $N_c$ region and electrons in the P region, very small currents flow across the barrier and the reverse direction has high resistance.

In diagram *d* of Fig. 11, the additional effect of applying a voltage in the forward direction across the $N_e$-P or left-hand barrier is shown. This is the forward direction for this barrier, and electrons tend to flow from $N_e$ to P. This current builds up exponentially with the voltage difference between $V_1$ and $V_2$. At the same time holes flow from P to $N_e$. However, for the structure shown, the hole current will be much smaller than the electron current; the reason for this being essentially that since more electrons are available in $N_e$ than holes in P as determined by the configuration of the device, more electrons will flow than holes for a given potential difference. The electrons which flow to P will diffuse thermally in P. Also they will drift in any field which is present. As a result they will get over the maximum in P and flow to $N_c$, and thence to electrode C.

Figure 12:
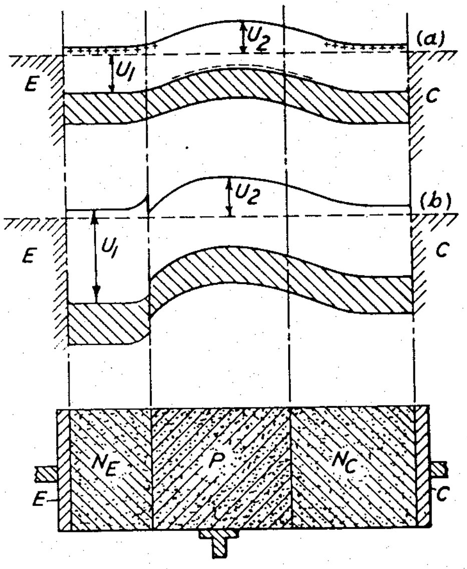
Fig. 12 is a diagrammatic showing similar to that of part *a* of Fig. 11 to illustrate the effect of using different materials for certain parts of the devices contemplated by the invention.

It should be noted that there are several other ways of reducing the hole current from P to $N_e$. Two of these are illustrated in Fig. 12. Diagrams *a* and *b* of this figure correspond to equilibrium or zero current situations for the device under consideration. Under these conditions the number of holes in region $N_e$ is determined by the potential energy difference $U_1$. If the potential difference is applied between $N_e$ and P in the forward direction across the barrier as is shown in Fig. 11D for example, then the concentration of holes in $N_e$ due to flow from P will tend to increase exponentially with the voltage difference $V_2-V_1$. Similarly the concentration of electrons flowing from $N_e$ to P will tend to increase exponentially in the same way starting with a value determined by $U_2$. Hence, if $U_2$ is initially less than $U_1$ the tendency of electrons to flow from $N_e$ to P will be greater than the tendency of holes to flow from P to $N_e$.

All of the cases considered in Figs. 11 and 12 are designed so as to produce this desirable difference between $U_2$ and $U_1$. In Figs. 11 and 12*a* this is accomplished by having different concentrations of impurities in $N_e$ and P in such a way that the net concentration of the electrons in $N_e$ is greater than the concentration of holes in P. In Fig. 11 the electron concentration is so high that a degenerate situation exists whereas in Fig. 12*a* a non-degenerate situation is shown. In Fig. 12*b* this effect is further enhanced by using two different semiconductors. The semiconductor used for $N_e$ has a wider energy gap since it is N-type. This increases the value of $U_1$ compared to $U_2$ in the P region. For example the $N_e$ zone may be of N-type silicon and the other two zones of P and N-type germanium respectively.

If we idealize the structure for the moment and neglect any resistances at the metal semiconductor contacts, and the hole current between P and $N_e$, the comparison between this device and a vacuum tube becomes clear. In place of the grid, there is the P region, which can be charged in respect to $N_e$ by holes. This modulates the flow of electrons from $N_e$ into P just as the charge on the grid modulates the flow of electrons from the cathode. The charging current to P, consisting of holes, does not flow to $N_c$ any more than does the charging current to the grid. Thus the fact that there are two processes of conduction through the P region permits control to take place in a way similar to that in the vacuum tube.

Before considering how the above description should be modified when neglected features are taken into account, consideration may be given to the feature common to devices which amplify alternating current power using a direct current power supply. Such devices have an input and an output circuit, and for purposes of discussion may be regarded as four terminal devices. Into the pair of input terminals there flows direct current and alternating current power ($P_{idc}$ and $P_{iac}$) and into the output terminals there is a similar flow ($P_{odc}$ and $P_{oac}$). For a steady state condition, the second law of thermodynamics requires that the sum of all these powers is positive. For an amplifier, however, $P_{oac}+P_{iac}$ is negative, meaning that the device gives out alternating current power. In a conventional circuit the power is taken out between plate and cathode and the alternating current and voltage under operating conditions are like those of a negative resistance. That is, when the plate potential swing is negative, the plate current swing (i. e., current into the tube, or electrons out) is positive. The reason for this behavior is that the plate impedance is relatively high. Hence, when the grid swing is plus the plate current is increased over the direct current value and remains increased even though a negative plate swing occurs. Hence, power can be delivered to the plate.

The $N_c$-P barrier acts in much the same way as the grid-plate region of the vacuum tube. There is a steady reverse current; however, this is relatively insensitive to plate potential. The electron current due to the difference in potential between E and B, is also relatively insensitive to collector voltage since once the electrons have passed the maximum potential point in P they are practically certain to be drawn to C. Hence the alternating current across the $N_c$-P barrier can be made out of phase with the voltage on C and output power can be delivered.

Next there may be taken into account the fact that there is actually a current flowing to B which may absorb input power. This current arises from several sources. Holes from $N_c$ will flow to P and also some holes from P will flow to $N_e$. Both of these currents tend to lower the impedance of B and require more power to drive it. Also, since B is positive some electrons entering P tend to flow to the electrode B thus contributing still another source of power absorption. Holes and electrons will also combine in P at an enhanced rate compared to thermal equilibrium because both the hole and the electron concentrations in P are appreciably greater than normal. This requires an additional hole current into P from B. However, proper geometrical requirements can be met so that these currents are sufficiently minimized to permit substantial power amplification.

The reason for this is that so long as the P layer is not too thick, an appreciable fraction of the electrons flowing from $N_e$ into P will continue to $N_c$. This means that the alternating current components of current in C will be comparable to the alternating currents in E and B. As will be pointed out later, a proper condition adjacent electrode C may actually lead to larger alternating current components in C than in either E or B. Furthermore, the impedance between E and B is relatively low since the $N_e$-P junction is operated in the forward direction. Since power is $I^2R$, and since the input and output currents are comparable but the output impedance is much higher, the output power is also much higher.

Figure 13:
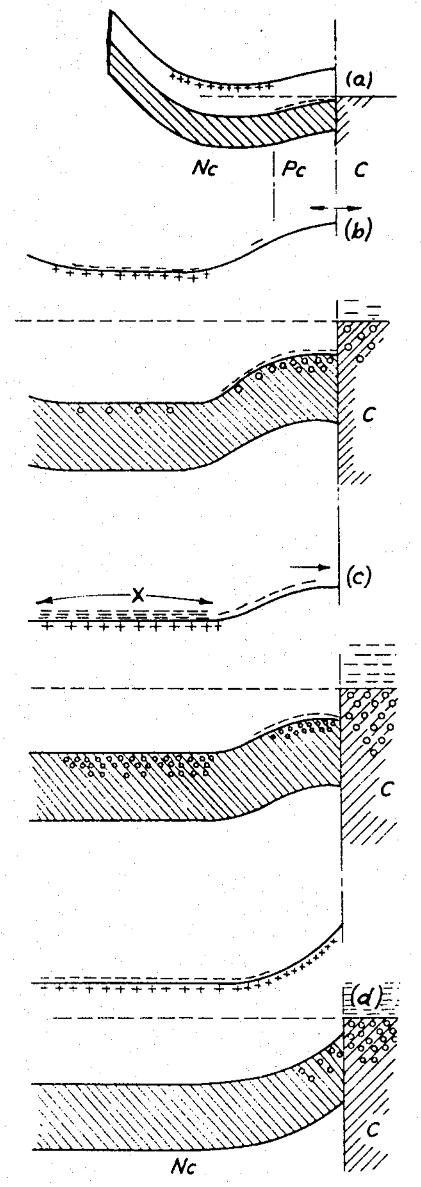
Fig. 13 is a diagrammatic illustration of conditions in the output portion of devices made in accordance with current amplifying features of the invention.

Consideration will next be given to a further means of utilizing the separability of the two conduction processes in semiconductors in order to increase the alternating current $I_c$ at C compared to the current $I_e$ at E and $I_b$ at B. In Fig. 13, diagram (*a*), the region just in front of the metal electrode C is shown, as if a layer of P-type material $P_c$ were inserted between $N_c$ and C. This may be done by actually inserting a thin layer of P-type material between $N_c$ and the electrode C or by replacing the electrode C by a point contact such as has been shown in Fig. 3B. When the voltage on B is made positive, the $N_c$-$P_c$ junction is operated in the forward direction. Hence, an appreciable fraction of the current between $P_c$ and $N_c$ may be holes, and this fraction will increase if $P_c$ is made more P-type. For the effects considered in this paragraph to be enhanced, a hole current from $P_c$ into $N_c$ and then to P is desirable. Hence the drawing is made as if $P_c$ had more holes than $N_c$ had electrons. The advantage of this structure is that it will lead to a multiplication of electron current arriving at the collector.

Diagram *b* in Fig. 13 shows the situation for no applied voltages on an enlarged scale with the electrons and holes depicted. In this case the net hole current and electron currents are each zero. In diagram *c*, Fig. 13, the situation is shown when an electron current is flowing in from P. In order for this current to flow away to the right, the potential hill between $N_c$ and C must be reduced. This is accomplished by electrons accumulating at X until their charge raises the potential sufficiently. They then flow off to C. This shift in potential also increases the easiness with which holes from $P_c$ can enter $N_c$ and then flow to P. The situation is entirely similar with the roles of holes and electrons reversed, to that at the emitter. There the electron current is increased by a charge of holes in the P region. Here the hole current is increased by an accumulation of electrons in the $N_c$ region. Also, as before, the hole current may be much larger than the electron current since more holes are available in this case. Hence, a small electron current may induce a much larger hole current.

It is not necessary, however, for the layer $P_c$ to have an excess of acceptors for the current enhancement discussed above to be accomplished. The essential feature is that the contact between the metal and the $N_c$ region presents a smaller barrier for hole flow than for electron flow. This can be accomplished as described above by adding a sufficient number of acceptors to $P_c$. However, it will also occur if the contact between C and $N_c$ has a sufficiently high rectifying barrier, as is shown in Fig. 13D and which may be produced for example by use of a rectifying contact as in Fig. 3B. In this case electrons flowing from P will tend to accumulate to the left of the barrier until they produce a space charge which raises the potential energy for electrons, as in Fig. 13C.

This change in potential between $N_c$ and C will increase the hole current from C to P as described above.

By means of this process the alternating current part of the current $I_c$ may be made much larger than that of the current $I_e$ and, consequently, the ratio of powers in the output and input circuits may be increased by current amplification as well as by voltage amplification.

Certain limitations exist in regard to the dimensions of parts of the units under discussion. These may be illustrated with respect to Figs. 3 and 3A. Under operating conditions, a certain current will be drawn by the P zone 51. In order that the potential of 51 be substantially uniform, its resistance in the direction of current flow, namely from base electrode 57 upwards in the figure, must not be too great. For any given width and conductivity in 51 this puts a limitation upon the minimum thickness, i. e., distance between barriers 54 and 55. Another closely related requirement on the thickness is that it present a substantial resistance to electron flow from N zone 52 to N zone 53. If the P zone is too thin, the space charge layer produced by operating junction 55 in the reverse direction will penetrate almost all of the P zone, thus eliminating its holes and its desired conductivity parallel to the barrier.

A maximum limitation on the thickness of the P zone is established by the recombination of holes and electrons. The P zone must not be so wide that electrons entering from the N zone 52 combine with holes before passing through the P zone and reaching the N zone 53. Experience with high-back-voltage germanium indicates that distances at least as large as $10^{-2}$ centimeters are acceptable under this limitation, although smaller ones are advantageous. A similar limitation is set by transit time effects. In the P zone there will be electric fields tending to cause a drift of electrons, also due to concentration gradients the electrons will diffuse. Because of these effects a time will elapse between a change in potential on 51 and the change in flow of electrons from 51 to 53. An additional time elapses before these electrons reach the additional P zone (layer 80, Fig. 3A) and produce the hole flow back to 51. If any of these "transit times" are comparable to a period of the impressed signal, loss in amplification will result.

The transit time and other capacitative effects may be reduced by increasing all acceptor and donator concentrations and reducing the scale of the device. The general trend of the behavior may be seen by arguments of a dimensional character. Thus if every linear dimension in the device is increased by a factor A and every charge density by a factor $A^{-2}$, the potential distribution will be unaltered in value but merely extended in scale. (If $\rho_0(x, y, z)$ is the old charge and $\rho_n(x, y, z)=A^{-2}\rho_0(x/A, y/A, z/A)$ is the new one, then the new potential at a point $Ax_0, Ay_0, Az_0$ is $$\begin{aligned}\varphi_{new}(Ax_0, Ay_0, Az_0) &= \frac{1}{4\pi\epsilon}\int\frac{\varphi_n(x, y, z)\,dxdydz}{[(x-Ax_0)^2+(y-Ay_0)^2+(z-Az_0)^2]^{1/2}}\\ &= \frac{1}{4\pi\epsilon}\int\frac{A^{-2}\varphi_0(x/A, y/A, z/A)\,A^3(dx/A)\,(dy/A)\,(dz/A)}{A\left[\left(\frac{x}{A}-x_0\right)^2+\left(\frac{y}{A}-y_0\right)^2+\left(\frac{z}{A}-z_0\right)^2\right]^{1/2}}\\ &= \frac{1}{4\pi\epsilon}\int\frac{\varphi_0(x', y', z')\,dx'dy'dz'}{[(x'-x_0)^2+(y'-y_0)^2+(z'-z_0)^2]^{1/2}}\\ &= \varphi(x_0, y_0, z_0)\end{aligned}$$

which proves that the potential distribution is simply magnified in its linear extent to fit the new structure. All transit times will be increased by a factor of $A^2$. This follows from the fact that both the diffusion constant and the mobility involve the length dimension to the plus two power, i. e., cm.²/sec. and cm.²/volt-sec. All current densities increase as $\rho$ times the electric field for drift current, i e., as $A^{-3}$, and as concentration gradient for diffusion current, i. e., as $\rho$/length or $A^{-3}$. Hence all conductances per unit area vary as $A^{-3}$. All capacities of N-P junctions, etc., vary as $1/A$ per unit area so that all charging time constants, capacity/conductance, vary as $A^2$. This same result may be obtained for the unit as a whole, since resistivity is proportional to $1/\rho$ or to $A^2$ and resistance is resistivity divided by length, the resistance of the unit varies as A. The over-all capacity also varies as A, again giving a time constant proportional to $A^2$.

The result of this analysis is thus that all time constants vary as $A^2$. If two units are produced, differing by the scale factor A as described, their external impedances should vary as A and their effective transit angles or the phase angles of their impedances should be equal at frequencies varying as $A^{-2}$.

Effects of recombination of electrons and holes should not be altered in an important way by the change in scale. This follows from the fact that the probability per unit time of an electron combining with a hole, either directly or by being trapped by a donor or acceptor, is proportional to the concentration of holes, donors or acceptors, and hence to $A^{-2}$. However, the time spent in any region is proportional to $A^2$. Hence the probability of an electron, or hole, transversing a certain layer without recombination is independent of A.

The temperature rise will depend on A. Assuming that the thermal conductivity is independent of the electrical conductivity, a situation which will be approximately true for semiconductors of reasonably high resistance, the thermal conductance of the unit will vary as A. Since the currents and consequently the power vary as $A^{-1}$, the temperature rise will vary as $A^{-2}$. This variation must be considered in designing particular units and may require operating small scale units at less favorable voltages than large scale units in order to reduce temperature rises. Any thermal time effects, as is well known from theory, and derivable as above vary as $A^{-2}$ and thus change their frequency with scale just as do the electrical effects.

This similitude theory shows that there will be great advantages in dealing with materials containing relatively high concentrations of donors or acceptors from the point of view of high frequency behavior. Even in principle, however, the change of scale cannot be pushed too far, because if the structures become too small, the essentially discrete character of the charge density becomes more important. Also the mean free path of the electron or hole becomes comparable with the thickness of the layers. Also, for sufficiently high concentrations, degenerate electron or hole gases will form. However, although these will modify the details of the argument, they will not invalidate the conclusion that operation at higher frequencies will result from increasing concentrations and decreasing scale.

There is a high degree of symmetry between the behavior of electrons and holes. (See, for example, F. Seitz, "Modern Theory of Solids," McGraw-Hill, 1940, pp. 456 and 457.) For this reason all of the results discussed above will be applicable if donors are interchanged with acceptors and holes with electrons and the energy diagrams are considered to represent potential energies for holes rather than for electrons. It is evident that this change will in no way alter an important feature of this invention which is the change in difficulty of traversal by carriers of one type of a region of the other conductivity type by varying electrically the concentration of carriers normally present in the region.

It is to be understood that the specific embodiments of the invention shown and described are but illustrative and that various modifications may be made therein without departing from the scope and spirit of this invention.

Reference is made to applications Serial No. 91,593, filed May 5, 1949, and Serial No. 91,594, filed May 5, 1949, each a division of this application wherein certain features of the devices and methods described hereinabove are claimed.

What is claimed is:

1. A solid conductive device for controlling electrical energy that comprises a body of semiconductive material having two zones of one conductivity type separated by a zone of the opposite conductivity type, said two zones being contiguous with opposite faces of said zone of opposite conductivity type, and means for making electrical connection to each zone.

2. A device as set forth in claim 1 in which one of the separated zones is of a semiconductive material having a wider energy gap than that of the material in the other zones.

3. A device as set forth in claim 1 in which one of the separated zones is of silicon containing significant impurities and the other two zones are of germanium containing significant impurities.

4. An electrical translating device comprising a body of semiconductive material including zones of opposite conductivity type and an intervening barrier, means for establishing electrical connections to said zones, and means including a third connection to said body for producing in said body an electrical field substantially parallel to said barrier.

5. A device for controlling electric current that comprises a body of semiconductive material including zones of opposite conductivity type separated by a barrier, a pair of connections to said body at regions on opposite sides of said barrier, a load circuit connected between said connections, and means including a third connection to said body for modifying the electron distribution adjacent said barrier thereby to control the current in said load circuit.

6. A device for controlling electric current that comprises a conductive body including zones of opposite electrical conductivity type separated by a barrier, means for making electrical connection to said body on opposite sides of said barrier, and means for establishing in said body an electric field substantially parallel to said barrier for controlling the electron distribution in a region adjacent the barrier and thus the resistance of the barrier to current flow between said electrical connection means.

7. A device for controlling electric current comprising a body of semiconductive material having a pair of spaced zones of the same conductivity type and a third zone of the opposite conductivity type, each of said pair of zones forming a barrier with said third zone, electrodes connected respectively to each of said zones, a load circuit connected between two of said electrodes, and means for controlling the current in said load circuit comprising an input circuit connected between one of said two electrodes and the third electrode.

8. A method of controlling electric current that comprises producing at least three electrical fields in a semiconductive body comprising zones of conductive material of respectively opposite conductivity types, two of said fields being of a sense to cause movement of carriers of charge to produce an electric current flow from one side to the other of the body and from one zone to the other, and another of said fields being variable to control the electron distribution between said sides so that the electric current is variable in response thereto.

9. A solid conductive device for controlling electric current that comprises a body of semiconductive material having zones of material of one conductivity type separated by an intermediate zone of material of opposite conductivity type, means for applying electric fields to said body by way of connections respectively to each zone, the fields associated with the connections to said separated zones being each in a sense to cause electric current flow in the same direction through said body and the field associated with the barrier between the intermediate zone and one of said separated zones being variable to control the current flow to the remaining zone.

10. Means for controlling the flow of electric current comprising a semiconductive body including two zones of material of one conductivity type separated by a third zone of material of the opposite conductivity type, means for making substantially ohmic contact to each of said zones, means for interconnecting the contact means including power sources connected to the separated zones for causing a current flow from one zone to the other through the intermediate zone, and variable field producing means for controlling the electron distribution in the intermediate zone to thereby vary the current between the separated zones.

11. Amplifying means comprising a semiconductive body including two zones of material of one conductivity type separated by an intermediate zone of material of the opposite conductivity type, means for making contact to each of said zones, means for interconnecting the contact means including a source of relatively low voltage connected to one of the separated zones, a source of relatively high voltage connected to the other of the separated zones, the sense of the high voltage being such as to cause electric current flow toward the high voltage connection, and means for controlling the flow in the intermediate zone.

12. Amplifying means as set forth in claim 11 in which the material in the zone at the low voltage end of the body has a different energy gap than that of the material in the other zones.

13. Amplifying means as set forth in claim 11 in which the material in the zone at the low voltage end of the body is silicon containing significant impurities and that in the remaining zones is germanium containing signilficant impurities.

14. Amplifying means comprising a semiconductive body including two zones of material of one conductivity type separated by a zone of the opposite conductivity type, said zones being respectively separated by a barrier, means for applying a relatively high voltage in the reverse direction across one barrier, and means for applying a variable bias across the other barrier.

15. The method of amplifying electrical energy that comprises introducing carriers of charge of a given sign into a semiconductive body at one point at relatively low voltage, extracting carriers of the same sign from the body at another point at relatively high voltage, said body including a rectifying barrier and said points being respectively on opposite sides of the barrier, and controlling the resistance to passage of said carriers in a portion of the body between said points by controlling the density of carriers of opposite sign in said portion of the body.

16. The method of amplifying electrical energy that comprises introducing carriers of charge of a given sign into a semiconductive body at a connection offering low impedance to entry of said carriers, extracting like carriers from said body at a connection offering high impedance to exit of said carriers, said body including a rectifying barrier and said connections being respectively on opposite sides of the barrier, and controlling the impedance to passage of said carriers in a portion of the body intermediate said connections.

17. A solid conductive device for amplifying electrical energy that comprises a body of germanium having two zones of one conductivity type contiguous with opposite faces of and separated by a zone of the opposite conductivity type, and means for making electrical connection to each zone.

18. A solid conductive device for amplifying electrical energy that comprises a body of germanium having two zones of N-type material separated by a thin zone of P-type material and forming two spaced barriers therewith, said barriers being spaced of the order of $1\times10^{-2}$ centimeters, and means for making electrical connection to each zone.

19. A solid conductive device for amplifying electrical energy that comprises a body of germanium having two zones of P-type material separated by and contiguous with opposite faces of a zone of N-type material, and means for making electrical connection to each zone.

20. A solid conductive device for amplifying electrical energy that comprises a body of silicon having two zones of one conductivity type separated by and contiguous with opposite faces of a zone of the opposite conductivity type, and means for making electrical connection to each zone.

21. A solid conductive device comprising a body of semiconductive material including an intermediate zone of material of one conductivity type flanked by zones of material of the other conductivity type, a grid embedded in the intermediate zone, and conductive coatings on portions of each flanking zone.

22. A solid conductor comprising three superposed layers of semiconductive material of alternately opposite conductivity type, means for making electrical connection to each layer, and means for externally interconnecting said connecting means whereby electrical energy flow between two of said connections may be controlled by interaction of electrical influences from the third connection.

23. A circuit element comprising a semiconductive body having contiguous zones of opposite conductivity types and characterized by high resistance of the transition region between said zones, means including a relatively low impedance input connection for causing current to flow into one of said zones, and means including a relatively high impedance output connection for withdrawing current from another of said zones.

24. A circuit element for controlling the flow of electric current that comprises a body of semiconductive material, means for making connections respectively to spaced portions of the body, additional means for making connection to a current flow inhibiting portion of the body intermediate said spaced portions, and means including sources of electric energy for externally interconnecting the connections whereby the inhibiting effect may be controlled by the additional means.

25. A circuit element for controlling the flow of electric current comprising a body of semiconductive material having alternate zones that conduct electronically by the excess and the defect processes respectively, the transition from zone to zone being characterized by high impedance, means for causing current to flow from zone to zone through the body, and means for varying the transition impedance to control the current from zone to zone.

26. A circuit element comprising a plurality of zones of semiconductive material of alternately opposite conductivity types including a first slab of one type, a slab of the other type and an insulating slab jointly covering one face of the first slab, a tapered slab of said one type on said last-named slabs with its thinner portion adjacent the insulating slab, a slab of said other type on the last-named slab, and means for making connections respectively to said first, second and last-named semiconductive slabs, said semiconductive slabs being respectively separated by barriers.

27. An electrical translating device comprising a body of semiconductive material having two zones of one conductivity type and a third zone of the opposite conductivity type between and in contact with said two zones, an output circuit connected between said third zone and one of said two zones, and an input circuit connected between said third zone and the other of said two zones.

28. An electrical translating device in accordance with claim 27 wherein said two and third zones are of germanium.

29. An electrical translating device comprising a body of semiconductive material having two zones of unlike conductivity type separated by a barrier, means for establishing current flow between said two zones, and means separate from said first means for controlling the impedance to such current flow introduced by said barrier.

30. A translating device comprising a body of semiconductive material including three successive zones of alternately opposite conductivity types and characterized by a relatively high transition impedance between the zones, a utilization circuit connected between the outer zones and means for varying the transition impedance.

31. A circuit element which comprises a block of semiconductive material, one part of said block being of one conductivity type, an adjacent part being of opposite conductivity type, an electrode in contact with each of said parts, another electrode, a work circuit interconnecting two of said three electrodes, and connections for applying a signal to the third of said electrodes, whereby the current in said work circuit is modified under control of said signal.

32. A translating device which comprises a body of semiconductive material having a barrier therein, at least three electrodes connected to said body, an output circuit including two of said electrodes, said barrier and a biasing source, and means including a source connected between one of said two electrodes and the third electrode for varying the electric gradient adjacent said barrier in conformity with a signal to vary the current flow between said electrodes.

33. A signal translating device comprising a body of semiconductive material of one conductivity type, emitter and collector connections to said body, a substantially ohmic base connection to said body, an output circuit connected between said collector and base connections and including a source biasing said collector connection in the reverse direction and an input circuit connected between said emitter and base connections and including a source biasing said emitter connection in the forward direction, one of said emitter and collector connections including a body of semiconductive material of the opposite conductivity type contiguous with and forming a barrier with said first body, and the other of said emitter and collector connections being spaced from said barrier.

34. A signal translating device comprising a body of semiconductive material having a first zone of one conductivity type, said body having a second zone of the opposite conductivity type forming a first junction with said first zone and a third zone of said opposite conductivity type forming a second junction with said first zone, a base connection to said first zone, an emitter connection to said second zone, a collector connection to said third zone, and means including sources interconnecting said connections for applying a bias in the forward direction across said first junction and a bias in the reverse direction across said second junction.

WILLIAM SHOCKLEY.

REFERENCES CITED

The following references are of record in the file of this patent:

UNITED STATES PATENTS

| Number | Name | Date |
|---|---|---|
| 1,745,175 | Lilienfeld | Jan. 28, 1930 |
| 1,877,140 | Lilienfeld | Sept. 13, 1932 |
| 1,900,018 | Lilienfeld | Mar. 7, 1933 |
| 1,904,276 | Boer et al. | Apr. 18, 1933 |
| 1,949,383 | Weber | Feb. 27, 1934 |
| 2,173,904 | Holst et al. | Sept. 26, 1939 |
| 2,208,455 | Glaser et al. | July 16, 1940 |
| 2,328,440 | Esseling et al. | Aug. 31, 1943 |
| 2,402,661 | Ohl | June 25, 1946 |
| 2,402,839 | Ohl | June 25, 1946 |
| 2,476,323 | Rack | July 19, 1949 |
| 2,486,776 | Barney | Nov. 1, 1949 |